(12) United States Patent
Zink

(10) Patent No.: US 9,995,637 B2
(45) Date of Patent: Jun. 12, 2018

(54) ELECTRIC PLUG CONNECTOR FOR THERMOCOUPLES, AND METHOD FOR PRODUCING SAME

(71) Applicant: Phoenix Contact GmbH & Co. KG, Blomberg (DE)

(72) Inventor: Fabian Zink, Detmold (DE)

(73) Assignee: PHOENIX CONTACT GMBH & CO. KG, Blomberg (DE)

(*) Notice: Subject to any disclaimer, the term of this patent is extended or adjusted under 35 U.S.C. 154(b) by 651 days.

(21) Appl. No.: 13/902,150

(22) Filed: May 24, 2013

(65) Prior Publication Data

US 2013/0336359 A1 Dec. 19, 2013

Related U.S. Application Data

(63) Continuation of application No. PCT/EP2011/005941, filed on Nov. 25, 2011.

(30) Foreign Application Priority Data

Nov. 26, 2010 (DE) ........................ 10 2010 052 478

(51) Int. Cl.
*G01K 7/00* (2006.01)
*G01K 1/00* (2006.01)
*G01K 13/00* (2006.01)
*G01K 7/02* (2006.01)

(52) U.S. Cl.
CPC ............ *G01K 7/023* (2013.01); *Y10T 156/10* (2015.01)

(58) Field of Classification Search
USPC .................................. 374/179, 183, 185, 152
See application file for complete search history.

(56) References Cited

U.S. PATENT DOCUMENTS

| 4,623,266 A | 11/1986 | Kielb | |
|---|---|---|---|
| 5,088,835 A * | 2/1992 | Shigezawa | G01K 7/023 136/230 |
| 5,167,519 A * | 12/1992 | Jones et al. | 439/259 |

(Continued)

FOREIGN PATENT DOCUMENTS

| DE | 8332007 U1 | 3/1984 |
|---|---|---|
| DE | 69533601 T2 | 11/2005 |

(Continued)

OTHER PUBLICATIONS

German Office Action; dated Jun. 8, 2011 for the related DE Application No. 10 2010 052 478.

(Continued)

*Primary Examiner* — Mirellys Jagan

(57) ABSTRACT

The invention relates to an electric plug connector for electrically connecting at least one first and one second thermocouple conductor, comprising at least one electrically conductive first and second contacting means, wherein the first thermocouple conductor is to be connected to the first contacting means, and the second thermocouple conductor is to be connected to the second contacting means, at least one first electrical temperature sensor, which is provided with a temperature sensing region and with at least one first and one second electrical contact, wherein at least one part of the temperature sensing region of the first temperature sensor is directly attached to the first contacting means by a joint.

19 Claims, 8 Drawing Sheets

(56) References Cited

U.S. PATENT DOCUMENTS

| | | | |
|---|---|---|---|
| 5,492,482 A * | 2/1996 | Lockman | G01K 7/12 |
| | | | 136/235 |
| 6,066,400 A | 5/2000 | Law et al. | |
| 6,068,400 A * | 5/2000 | Nelson et al. | 374/179 |
| 7,044,638 B2 * | 5/2006 | Phillips | G01K 7/04 |
| | | | 374/180 |
| 7,994,416 B2 * | 8/2011 | Schuh | 136/230 |
| 8,608,377 B2 * | 12/2013 | Conti | G01K 7/02 |
| | | | 136/236.1 |
| 8,996,327 B2 * | 3/2015 | Ge | G01K 1/20 |
| | | | 374/166 |
| 2004/0255998 A1 * | 12/2004 | Schuh | G01K 7/13 |
| | | | 136/224 |
| 2005/0047479 A1 * | 3/2005 | Underwood et al. | 374/181 |
| 2008/0013598 A1 * | 1/2008 | Perotti | G01K 7/026 |
| | | | 374/179 |
| 2012/0065923 A1 * | 3/2012 | Whiteley | G01K 7/023 |
| | | | 702/130 |
| 2012/0076170 A1 * | 3/2012 | Lee | 374/179 |
| 2014/0269821 A1 * | 9/2014 | Egley et al. | 374/54 |
| 2015/0030053 A1 * | 1/2015 | Akervall | G01K 7/023 |
| | | | 374/179 |

FOREIGN PATENT DOCUMENTS

| | | |
|---|---|---|
| EP | 0686835 A1 | 12/1995 |
| EP | 1510801 A1 | 3/2005 |
| IE | 892615 A1 | 2/1991 |
| WO | WO2012069205 A1 | 5/2012 |

OTHER PUBLICATIONS

International Search Report and Written Opinion; dated Mar. 15, 2012 for related PCT Application No. PCT/EP2011/005941.
International Preliminary Report on Patentability; dated Jun. 6, 2013 for the related PCT Application No. PCT/EP2011/005941.
Russian Office Action; dated May 4, 2014 for the related RU Application No. 2013128959/28/043154.

* cited by examiner

ELECTRIC PLUG CONNECTOR FOR THERMOCOUPLES, AND METHOD FOR PRODUCING SAME

CROSS-REFERENCE TO RELATED APPLICATIONS

This application is a continuation of International Application No. PCT/EP2011/005941, filed Nov. 25, 2011, which claims the benefit of German Application No. 10 2010 052 478.6, filed Nov. 26, 2010, the teachings of both of which are incorporated herein by reference.

FIELD OF THE INVENTION

The invention relates to an electric plug connector for electrically connecting at least one first and one second thermocouple conductor, comprising at least one electrically conductive first and second contacting means, wherein the first thermocouple conductor is to be connected to the first contacting means, and the second thermocouple conductor is to be connected to the second contacting means.

BACKGROUND OF THE INVENTION

Electric plug connectors for thermocouple elements of the kind described are electrically connected to the electrical conductor ends of a thermocouple or to a compensating conductor attached thereto, usually by means of a clamp connection. Plug connectors of this kind for thermocouples are also referred to as thermocouple plugs or thermoplugs. They are used as a universal electrical connecting means and for the standardized electrical connection of thermocouples to measuring instruments, measuring cabinets, electrical circuit arrangements or the like when constructing a temperature measuring chain. Thermocouple plugs are usually plugged into a socket or into a plug-in coupling that is complementary to the plug in order to make contact with a measuring instrument or with a circuit arrangement. For this purpose, the plug-in or coupling socket to be connected to the thermocouple plug is mounted either directly on the board of a circuit arrangement, for example an electrical printed circuit board, or on a housing of the measuring instrument, for example a measuring or switching cabinet. In order to cover larger measuring distances, a compensating conductor, which, in a certain temperature range, has comparable thermoelectric properties to the two thermocouple conductors, can be used as a cost-effective extension between the temperature measuring point and a measuring instrument. If a compensating conductor is used, then this is usually provided with a connecting terminal to which the two open thermocouple conductors can be electrically connected, wherein the thermocouple plug is fitted to the opposite end of the compensating conductor.

The measuring principle of thermocouples for measuring temperature is based, according to the thermoelectric effect, on the development of a thermoelectric voltage between two wire conductors that are connected to one another at one end when the connecting point has a different temperature from the two open conductor ends at which the thermal voltage can be measured. The two electrical conductors, which are made of different materials and are referred to as a thermocouple pair, are connected to one another at the temperature measuring point of the thermocouple. At the open end of each, the so-called comparison or cold junction, the two thermocouple conductors are connected to a measuring instrument for measuring the thermoelectric voltage.

In order to determine the temperature of the measuring point from the value of the measured thermoelectric voltage by means of a thermocouple, the temperature of the comparison point must be taken into account, as the thermoelectric voltage that can be measured at a thermocouple depends on the temperature difference between the measuring point and the comparison point. Consequently, the temperature of the measuring point must be determined from the measured value of the thermoelectric voltage relative to the temperature of the comparison point.

Temperature-dependent resistors, which are used for determining and compensating the temperature of the comparison point of a thermocouple, are disclosed in the prior art. Furthermore, methods that not only determine the values of the thermoelectric voltage by means of integrated circuits but also directly compensate the comparison temperature are disclosed in the prior art. The disadvantage of known methods of this kind is, however, that the temperature is not measured directly at the comparison point of the thermocouple, that is to say not at the two conductor ends of the thermocouple or the compensating conductor, but usually on a circuit arrangement or a board that is located within a housing of a measuring instrument or a measuring cabinet. As the two conductors are usually attached to a terminal outside the measuring instrument, a temperature variation therefore exists between the actual and the measured temperature of the comparison point.

A universal connector with temperature compensation of the temperature of the comparison point is disclosed in U.S. Pat. No. 5,167,519. A thermocouple plug can be electrically connected to such a universal connector by means of a screw terminal connection. In order to measure or compensate the temperature of the comparison point, an electrical temperature sensor is fitted on universal connectors of this kind between two galvanically isolated copper blocks, to which the connecting pins of a thermocouple plug to be connected can be fixed by means of a clamp connection.

The universal connector disclosed in publication U.S. Pat. No. 5,167,519 does not solve the problem that the electrical connecting point between a thermocouple plug or between its electrical connecting pins and a universal connector equipped with a temperature sensor presents a not inconsiderable thermal contact resistance.

As a temperature gradient is necessarily present between the measuring point of the thermocouple, that is to say at the measuring location, and the comparison point, that is to say at the conductor ends of the thermocouple that are electrically connected to the thermocouple plug of a thermocouple, the comparison point is subject to a continuous supply or removal of heat and therefore to at least temporary heating and cooling—depending on whether a positive or negative temperature gradient is present—due to the heat-conducting properties of the two thermocouple conductors.

Furthermore, a continuous supply or removal of heat can likewise take place via the connecting pins of the thermocouple plug, which, for example is connected to a universal plug according to publication U.S. Pat. No. 5,167,519. If, however, the connecting point between the electrical connecting pins of the thermocouple plug and the universal connector has a thermal contact resistance, then a temperature gradient can be observed between the temperature of the comparison point and that at the temperature sensor, as a result of which the measurement of the comparison temperature is subject to a measuring error.

If, in addition, thermocouple plugs with thermocouple conductors of different cross sections or thermal conductivities are fitted to a universal connector of this kind, then an effect on the temperature measurement at the comparison point is likewise to be expected as a result of a changed thermal conduction resistance and a consequently changed temperature gradient.

Furthermore, if a thermocouple plug fitted to a universal connector of this kind is subjected to hot or cold air currents associated with locally different ambient temperatures, or if a thermocouple with a starting temperature that differs from the temperature at the temperature sensor is connected to a universal connector of this kind, for example when changing or replacing a thermocouple, then a temperature gradient is likewise present between the temperature sensor and the comparison point, as a result of which the measuring chain is subject to a random or dynamic measuring error respectively.

BRIEF SUMMARY OF THE INVENTION

Against the background of the identified prior art, the invention is based on the object of enabling an improved device for determining and compensating the temperature of the comparison point of thermocouples when using a thermocouple plug. Furthermore, the device is to be easy and inexpensive to produce as well as being easy to assemble and at the same time offering good applicability.

Solutions to the problem according to the invention are given by the subject matter with the characteristics as claimed in the attached independent claims. Advantageous and/or preferred embodiments and developments are the subject matter of the dependent claims.

Significant advantages of the invention and its individual embodiments or developments are accordingly founded on the fact that the heat losses that occur between the connecting point of a thermocouple plug and a mating plug connector fitted to a measuring instrument, into which the thermocouple plug is plugged, do not affect the measurement of the temperature of the comparison point. Furthermore, the invention enables thermocouples with any cross sections and any thermal conductivities to be used or applied, thus resulting in greater flexibility in the choice of a suitable thermocouple without the fear of the accuracy of the temperature measurement being affected.

The invention can be used particularly advantageously for measuring applications in which changing ambient temperatures and changing thermodynamic initial conditions can affect the accuracy of the temperature measurement with a thermocouple, wherein these disturbing influences are compensated by the invention.

The object of the invention is achieved by an electric plug connector for electrically connecting at least one first and one second thermocouple conductor, comprising at least one electrically conductive first and second contacting means, wherein the first thermocouple conductor is to be connected to the first contacting means, and the second thermocouple conductor is to be connected to the second contacting means, at least one first electrical temperature sensor, which is provided with a temperature sensing region and with at least one first and one second electrical contact, wherein at least one part of the temperature sensing region of the first temperature sensor is attached to the first contacting means by a joint.

The invention is accordingly based on the idea of providing an electric plug connector for thermocouples that includes a facility for measuring the temperature of the comparison point, that is to say measuring the temperature at the two ends of thermocouple conductors.

For this purpose, according to the invention, at least one part of the temperature measuring point of at least one temperature sensor is attached to an electrical contacting means of the electric plug connector. The comparison points, that is to say the open conductor ends of at least one first and one second thermocouple conductor, are to be electrically connected to this and to at least one further electrical contacting means so that the temperature sensor, its temperature sensing region and the comparison points of the thermocouple are in the immediate vicinity of one another and expediently adjoin one another.

According to a further feature of the invention, the electric plug connector comprises at least two electrically conductive contacting means. The ends of at least two thermocouple conductors, that is to say the comparison points of the thermocouple, are to be electrically connected to these contacting means. These contacting means likewise serve to electrically connect to further contacting means that are accommodated in a mating plug connector, in particular in a socket or a plug-in coupling that is complementary to the electric plug connector according to the invention, into which the plug connector according to the invention can be plugged.

According to the invention, the electric plug connector comprises at least one electrical temperature sensor, wherein at least one part of the temperature sensing region of the temperature sensor is attached, i.e., in particular directly attached, to the first contacting means of the electric plug connector according to the invention, in particular to at least one section of its surface, by means of a releasable or non-releasable joint.

In practice, a joint that exclusively allows the transfer of heat between the first contacting means and the part of the temperature sensing region of the temperature sensor that is attached to this contacting means to the layer elements that here improve the resulting boundary layer by joining, such as for example heat-conducting pastes or other mechanical layer elements that are advantageous for heat conduction, and/or allows joining means that are necessary for the joint, such as for example adhesives, welding fluxes or solder, screw or rivet connections, and/or allows means that enable electrical insulation so that the temperature sensing region of the temperature sensor is galvanically isolated from the contacting means, has been shown to be particularly advantageous for the invention.

A temperature sensor is understood to mean any measuring sensor that is provided with a temperature sensing region and is suitable for measuring the surface temperature on at least one contacting means of the plug connector according to the invention. The temperature sensor and the temperature sensing region can have any form and a measuring surface of any size. The temperature sensing region of the temperature sensor can therefore take up only one part or one section of the overall surface of the temperature sensor, or the temperature sensing region is formed by the whole outer surface of the temperature sensor. Furthermore, at least one part of a temperature sensor or at least one part of further temperature sensors can be encompassed by a protective layer and/or by a heat-conducting material layer, in particular by a ceramic, which in this case forms at least one part of the temperature sensing region of the temperature sensor.

According to the invention, the at least one electrical temperature sensor is provided with at least one first and one second electrical contact. This temperature sensor is used to tap off an electrical parameter, in particular a resistance value, which changes with temperature. For this purpose, an electrical voltage, which is supplied from a circuit arrangement for evaluating the temperature measured with the temperature sensor, can be applied to the two electrical contacts of the temperature sensor.

If the electric plug connector according to the invention is accommodated in a plug connector housing, then the electrical contacting means are advantageously accommodated in a plug connector housing of this kind. Furthermore, in an advantageous embodiment, the temperature sensor and the temperature sensing region are accommodated within the plug connector housing.

The improvement in measurement that can be achieved by the invention is achieved by the thermodynamically substantially ideal arrangement of the temperature sensing region of the temperature sensor on at least one first contacting means of the electric plug connector according to the invention. The conductor ends of a thermocouple that are connected to the first and second contacting means, that is to say the comparison point of the thermocouple, are therefore arranged in the immediate vicinity of the temperature sensor or its temperature sensing region, which is mounted on the at least one first contacting means, as a result of which the thermal disadvantages of the prior art already mentioned are eliminated when measuring the temperature of the comparison point on a thermocouple, and therefore an error-free measuring chain is created when using a thermocouple with a thermocouple plug that is fitted thereto.

Furthermore, an electric plug connector of this kind according to the invention enables thermocouples to be used universally and flexibly at varying measuring locations with different ambient temperatures, and at the same time the measuring chain is ready for immediate use without having to take into account dynamic measuring errors due to temperature adjustments at the electrical connections of the measuring chain.

Furthermore, any type of thermocouple with any material combinations, cross sections and any thermal conductivities or any thermodynamic characteristics can be connected to a plug connector according to the invention, thus resulting in greater flexibility in the choice of a suitable thermocouple for the particular measuring application without an effect on the accuracy or the tolerance to errors being expected when measuring the temperature.

In addition, an improved flexibility in the choice of a suitable temperature sensor for measuring the temperature of the comparison point is achieved by the invention. Whereas, due to the integration of temperature sensors in measuring instruments, on circuit arrangements or in universal plug connectors for plugging-in thermocouple plugs, measuring methods for determining the temperature of the comparison point disclosed in the prior art do not allow the temperature sensor to be changed, a flexible adaptation to the measuring task is possible with the plug connector according to the invention. Electric plug connectors with temperature sensors can therefore be used for special measuring applications that require special characteristics, for example low measuring tolerances or high measuring speeds. Furthermore, electronic measuring equipment, that is to say existing measuring instruments and measuring peripherals, can necessitate the use of temperature sensors with special electronic requirements, thus resulting in a particularly advantageous flexibility in this regard when matching the measuring equipment to the measuring task, in that different electric plug connectors, according to the invention, are available for different measuring requirements.

Further economic advantages of the invention arise from the possibility of being able to use measuring instruments without integral temperature sensors for measuring the temperature of the comparison point, as a result of which universal measuring instruments can be used, thus resulting in a cost saving.

In a preferred embodiment of the invention, at least one part of the temperature sensing region of the temperature sensor is attached to the first and to the second contacting means of the electric plug connector according to the invention by a joint. In particular, this advantageously enables the measurement of the comparison temperature at the first and at the second contacting means to be carried out simultaneously by means of a single temperature sensor, and heat to be exchanged between the first and the second contacting means.

In a particularly advantageous embodiment of the invention, the temperature sensing region has heat-conducting properties. In order to achieve the heat transfer between the temperature sensing region of the temperature sensor and the first and second contacting means, which are to be galvanically separated, a means for improving the heat transfer, in particular a heat-conducting paste or a heat-conducting adhesive, or an element for improving the heat conduction, is fitted between the connecting point, that is to say between the part of the temperature sensing region of the temperature sensor which is attached to the first contacting means and/or the part of the temperature sensing region of the temperature sensor which is connected to the second contacting means. This improves the heat conduction at the boundary layer of the joint in an advantageous manner.

Furthermore, the joint can comprise means that enable electrical insulation, so that the temperature sensing region of the temperature sensor is galvanically isolated from the first and/or second contacting means.

In another preferred embodiment of the invention, at least one part of the temperature sensing region of the first temperature sensor is connected to the first contacting means, and one part of the temperature sensing region of a second temperature sensor is attached to the second contacting means by a joint. This gives rise to the advantage of a separate temperature measurement by means of two temperature sensors on the first and second contacting means and a necessary galvanic isolation of the two contacting means.

In a further embodiment of the invention, the electric plug connector according to the invention has a multi-pole design and, as well as the first and the second, has an electrically conductive third contacting means that can likewise be arranged within a plug connector housing.

In a further advantageous embodiment of the invention, the first electrical contact of the temperature sensor is electrically connected to the third contacting means and the second electrical contact of the temperature sensor is electrically connected to the first or to the second contacting means. As a result of such an arrangement of the electrical contacts of the temperature sensor, an electric plug connector is created, which, as well as enabling the temperature of the comparison point on the thermocouple conductors that are electrically connected to first and second contacting means of the plug connector to be measured, also enables the electrical contacts of the temperature sensor that measures the temperature of the comparison point to be electrically connected. As well as the electrical transmission of the thermoelectric voltage present at the thermocouple conductor ends, a three-pole electric plug connector of this kind therefore also enables the electrical transmission of the electrically measured parameter of the temperature sensor to an electrical circuit arrangement, for example to a temperature interface in a measuring instrument, which is able to evaluate the thermoelectric voltage value as well as the electrical parameter of the temperature sensor. For this purpose, the measuring instrument or the electrical circuit arrangement is likewise equipped with a three-pole, electrical mating connector, for example an electrical socket or a plug-in coupling, which is complementary to the electric plug connector according to the invention.

Expediently, in a further advantageous embodiment of the invention, the electric plug connector according to the invention is provided with a fourth electrically conductive contacting means that is likewise arranged within a plug connector housing. With such an embodiment of the invention, the second electrical contact of a first temperature sensor is not electrically connected to the first or to the second but to the additional, fourth contacting means, which results in the advantage of a galvanic isolation of the first and second contact of the temperature sensor from the first or second contacting means of the electric plug connector according to the invention and therefore from the thermoelectric voltage signal.

If the electric plug connector according to the invention is provided with a first and a second contacting means, in a further embodiment of the invention, the plug connector according to the invention can comprise a fifth and sixth electrically conductive contacting means, to which the electrical first and second contact of the second temperature sensor is connected, in each case galvanically isolated. This fifth and sixth electrically conductive contacting means can likewise be accommodated within a plug connector housing, thus creating a six-pole thermocouple plug that is designed with two temperature sensors for separate measurement of the temperatures of the comparison points on a thermocouple connected to the plug connector, and with which a complete galvanic isolation of the individual contacting means is provided.

Electrical temperature sensors, which are in the form of temperature-dependent resistors, are preferably preferred for measuring the temperature of the comparison point. Preferred temperature-dependent resistors are, in particular, NTC or PTC resistors, wherein, according to the invention, all known types of electrical temperature sensors or temperature measuring devices can be used without restriction.

Expediently, the temperature sensing region of the first temperature sensor and also of further temperature sensors is designed to be heat-conducting. Furthermore, the temperature sensing region can be formed by a heat-conducting ceramic or a ceramic body, by which the temperature receiver is completely or partially encompassed or coated, wherein the ceramic material is preferably designed as an electrical insulator.

In an advantageous embodiment of the invention, the first and second contacting means is connected in a heat-conducting manner by means of a ceramic connecting element or by means of an element made from another heat-conducting material, thus enabling a temperature equalization to take place between the first and the second contacting means. One or more temperature sensors for measuring the temperature of the connecting element can be fixed in or on a connecting element of this kind.

In a particularly advantageous embodiment of the invention, a temperature sensor provided with a ceramic or other heat-conducting sleeve is attached to the first and the second contacting means by a joint. In order to galvanically isolate the first and second contacting means, the material encompassing the temperature sensor is an electrical insulator.

To produce an electric plug connector according to the invention for thermocouples, at least one part of the temperature sensing region of a first temperature sensor is attached to the first contacting means by a jointing process.

In a further embodiment of the invention, at least one part of the temperature sensing region of the first temperature sensor is attached to the first contacting means by a bonding jointing process, in particular with an adhesive joint.

Expediently, an adhesive process is used to produce the joint. In a particularly advantageous embodiment, at least one part of the temperature sensing region or one part of the surface of a sleeve of a temperature sensor and/or one part of the first and second contacting means of the electric plug connector is wetted with two-component adhesive containing epoxy resin, and then the part of the temperature sensor that is wetted with adhesive is attached to the first and second contacting means.

Expediently, in a particular embodiment of the invention, in order to improve the heat-conducting properties of the joint, the adhesive is provided with an additive that increases the heat-conducting capability. Furthermore, at least one part of the surface of the temperature sensing region of the first temperature sensor is first provided with a heat-conducting paste and/or with an element that improves the heat-conducting capability and/or produces galvanic isolation, and then the temperature sensing region of the temperature sensor is attached to the first and/or to further contacting means by means of an adhesive process, a welded or solder connection or a screw or rivet connection.

BRIEF DESCRIPTION OF THE DRAWINGS

The electric plug connector according to the invention for thermocouples is described below in preferred exemplary embodiments. In the drawing.

DETAILED DESCRIPTION OF THE INVENTION

Before going into the preferred exemplary embodiments shown in the figures, it must be pointed out that a plug connector according to the invention can be designed with or also without plug connector housing.

Figure 1:
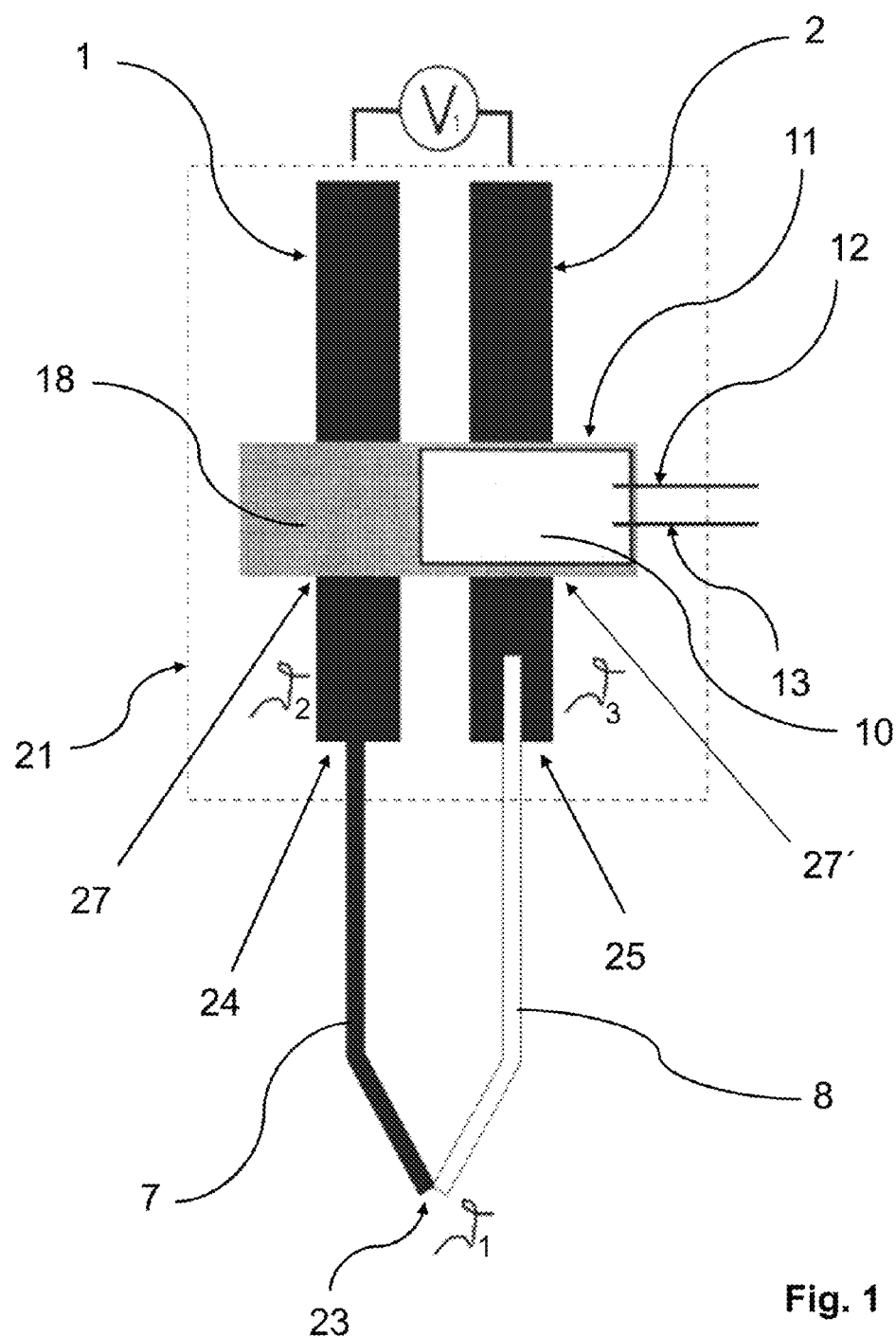
FIG. 1: shows a schematic view of an electric plug connector and a temperature sensor.
Figure 2:
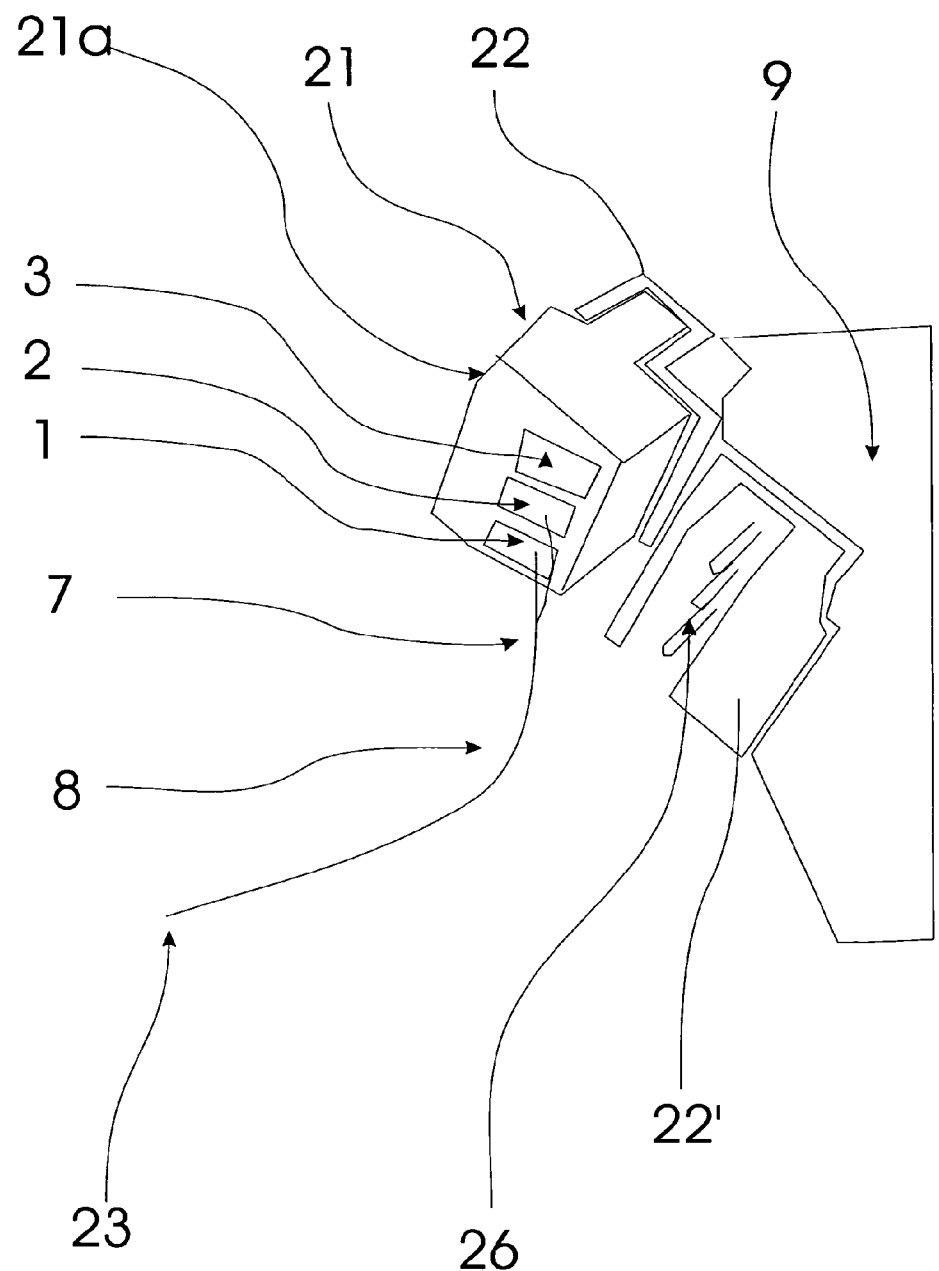
FIG. 2: shows a sketch of a thermocouple with a three-pole electric plug connector in a socket on an electrical circuit arrangement in perspective view.
Figure 6:
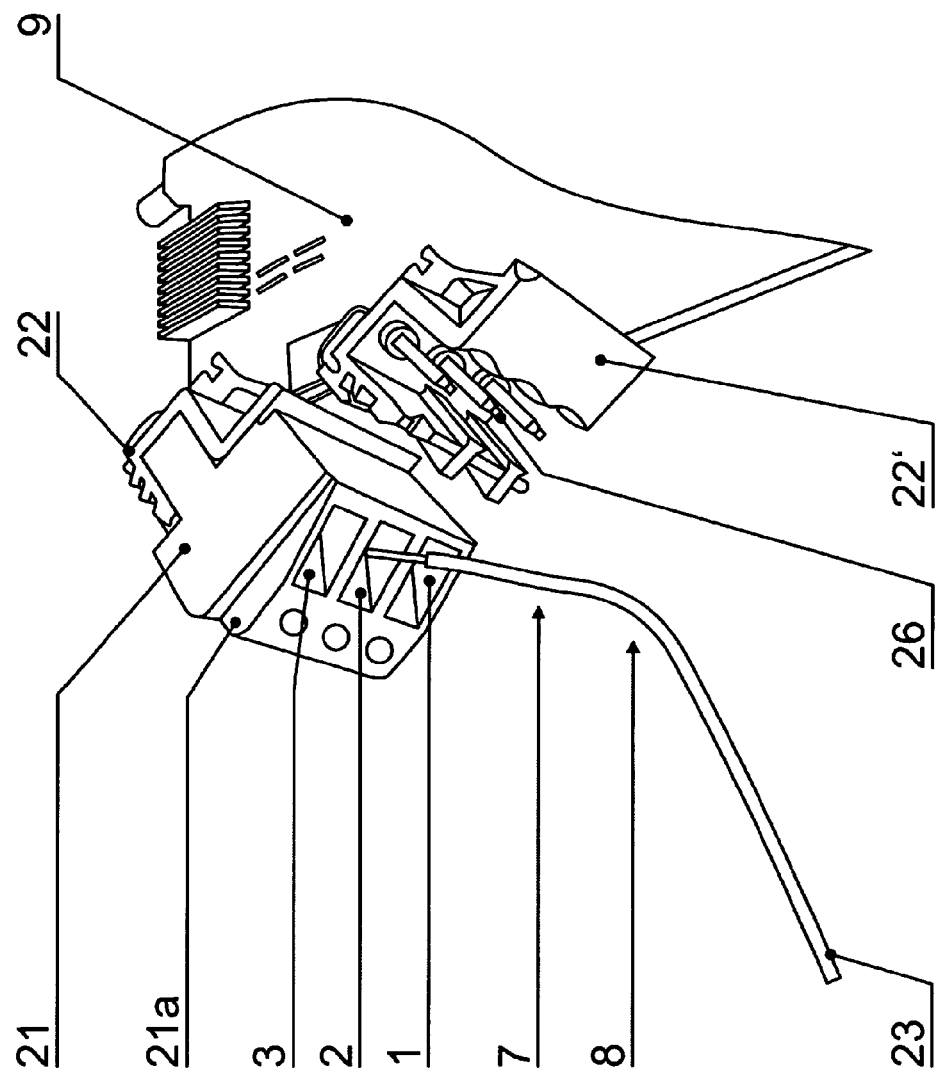
FIG. 6: shows a thermocouple as shown in the sketch of FIG. 2 with a three-pole electric plug connector in a socket on an electrical circuit arrangement in perspective view.

FIG. 1 shows a schematic view of the electric plug connector according to the invention based on an exemplary embodiment in which the plug connector has a plug connector housing 21. A first and second electrical contacting means 1 and 2 are in this case therefore expediently arranged within the plug connector housing 21, which is shown by the dashed outline. In the exemplary embodiment, the contacting means 1 and 2 are in the form of pins for a plug connector in the form of a plug. However, it must be pointed out that the contacting means 1 and 2 can also be in the form of sockets for a plug connector in the form of a socket. The two thermocouple conductors 7 and 8 of a thermocouple are in each case electrically connected to one end of the first and second electrical contacting means 1 and 2, wherein said thermocouple conductors are attached to one another at the measuring point 23 for measuring a temperature 151 at a remote measuring location. At the other end in each case of the first and the second electrical contacting means 1 and 2 of the electric plug connector, a thermoelectric voltage V1 can be tapped off and, as can be seen in FIG. 2 and FIG. 6 for example, transmitted to a circuit arrangement 9 by pairing the electric plug connector with a complementary plug connector that is fitted to the circuit arrangement 9.

In order to measure a temperature ϑ2 of the comparison point at a comparison point 24 of the first thermocouple conductor 7, referred to the temperature ϑ1, one part of a temperature sensing region 11 of a temperature sensor 10 is attached to the first contacting means 1.

In order to measure a further temperature ϑ3 of the comparison point at a comparison point 25 of the second thermocouple conductor 8, referred to the temperature ϑ1, one part of a temperature sensing region 11 of this temperature sensor 10 is also attached to the second contacting means 2.

The temperature sensor 10 is at least partially encompassed by a ceramic body 18, as a result of which the temperature sensing region 11 of the temperature sensor 10 is formed by part of the encompassing ceramic body 18. The surface of the temperature sensing region 11 in FIG. 1 therefore points into the plane of the drawing. One part of the temperature sensing region 11 is attached in a heat-conducting manner to the first contacting means 1 by a joint 27 and a further part of the temperature sensing region 11 is attached in a heat-conducting manner to the second contacting means 2 by a joint 27', as a result of which a temperature equalization can take place between the first and the second contacting means, i.e., therefore in particular directly attached.

Expediently, the joints are adhesive joints. In order to tap off the electrical temperature parameter of the measurement of the temperature of the comparison point with the temperature sensor 10, in the present example its two electrical contacts 12 and 13 are therefore fed out of the plug connector housing 21.

FIG. 2 and FIG. 6 show in perspective view a preferred exemplary embodiment of a three-pole electric plug connector according to the invention and a thermocouple that is electrically connected thereto with two thermocouple conductors 7 and 8 that are electrically connected to one another at the measuring point 23 of the thermocouple.

The plug connector shown in FIG. 2 and FIG. 6 is again mounted in a plug connector housing 21 with a housing cover 21a. The first electrical temperature sensor 10 for measuring the temperature of the comparison point is likewise arranged within the plug connector housing 21. The plug connector is designed as an electrical plug and is plugged into an electrical socket 22 that is arranged on a circuit board with an electrical circuit arrangement 9.

In contrast to the plug connector according to FIG. 1, the plug connector housing 21 of the electric plug connector has three access openings to three, i.e., a first, a second and a third, contacting means 1, 2, 3 that are accommodated within the plug connector housing 21 and are therefore not visible. The thermocouple is electrically connected to the electric plug connector shown in FIG. 2 and FIG. 6 by means of two thermocouple conductors 7 and 8 to the first and second contacting means respectively, the two thermocouple conductors 7 and 8 in each case being fed through the first and second access opening in the plug connector housing 21 for this purpose.

The socket 22 has complementary contacting means, which, as a result of the pairing, are not visible, and enable an electrical contact to be made with the first, the second and the third contacting means 1, 2, 3 of the electric plug connector when the plug connector is plugged into the socket 22.

The electrical circuit arrangement 9 serves to process or evaluate the thermoelectric voltage value and the temperature parameter generated by the first electrical temperature sensor 10. Both measurements are transmitted by means of the electric plug connector to the electrical circuit arrangement 9. Furthermore, a further, unpopulated socket 22', in the present case with three pin-like contacting means 26, for connecting a further electric plug connector according to the invention that is arranged on the circuit board and is likewise electrically connected to the circuit arrangement 9 can be seen in FIG. 2 and FIG. 6.

Figure 3:
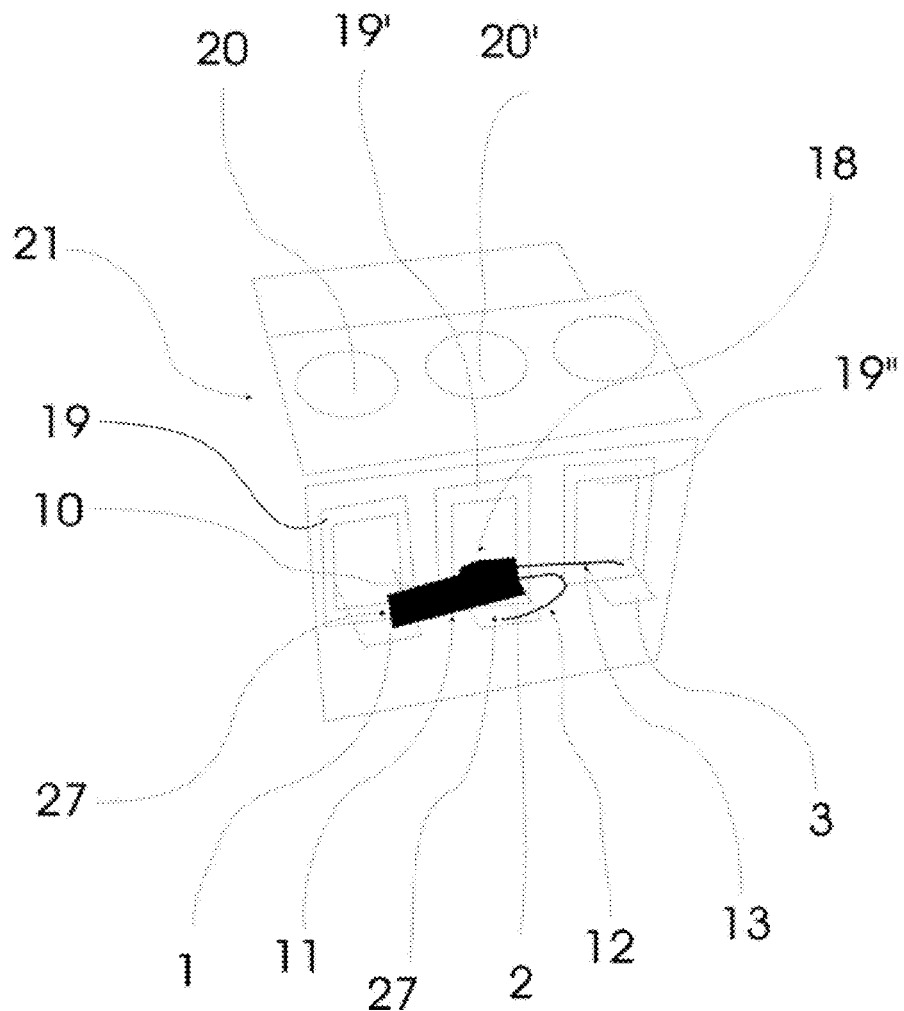
FIG. 3: shows a sketch of an open three-pole electric plug connector with a temperature sensor.
Figure 7:
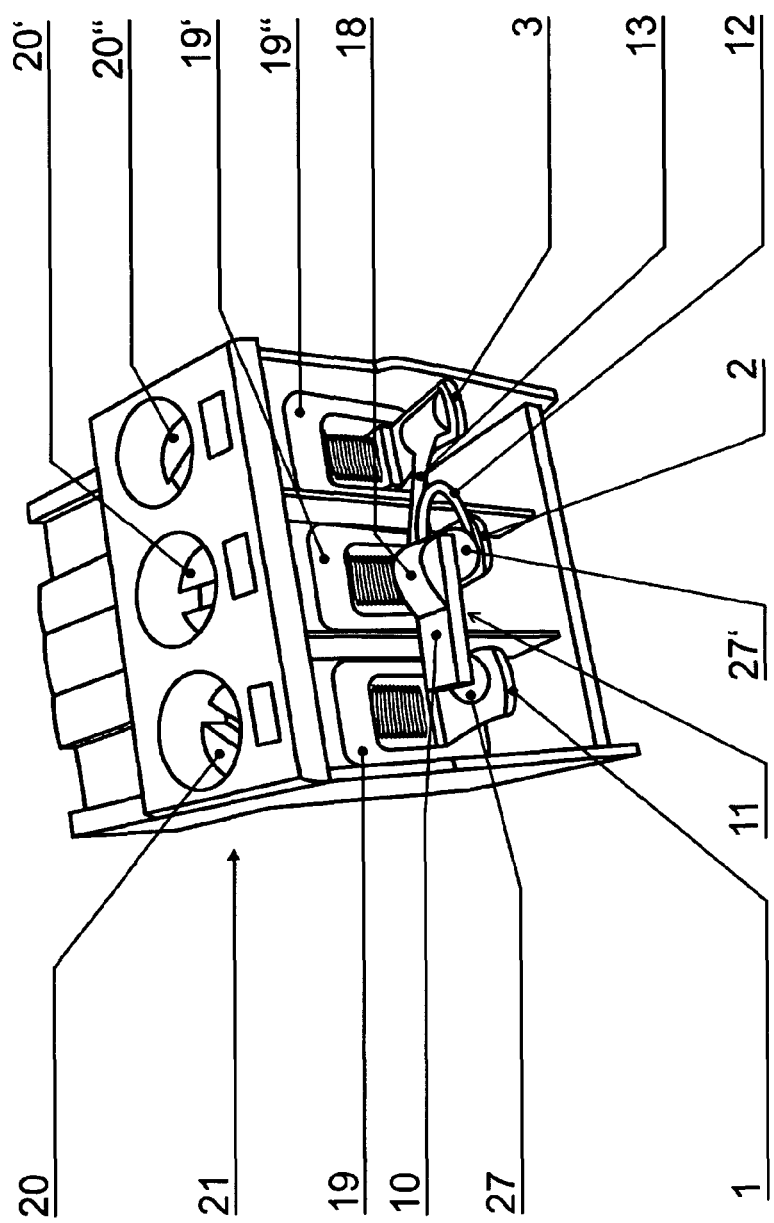
FIG. 7: shows an open three-pole electric plug connector as shown in the sketch of FIG. 3 with a temperature sensor.

FIG. 3 and FIG. 7 show the open plug connector housing 21 of the three-pole electric plug connector shown in FIG. 2 with a first, a second and a third contacting means 1, 2, 3 that are accommodated within the plug connector housing 21. A housing cover 21b of the plug connector housing 21 which may be present is not visible in FIG. 3 and FIG. 7.

Two thermocouple conductors 7 and 8 can be electrically connected to the first and to the second contacting means of the plug connector shown in FIG. 3 and FIG. 7, wherein the second contacting means also serves to electrically connect a first electrical contact 12 of a temperature sensor 10. Two electrical contact elements are therefore connected to the second contacting means, on the one hand the second thermocouple conductor 8 and, on the other, the first electrical contact 12 of the temperature sensor 10. The third contacting means serves to electrically connect a second electrical contact 13 of the temperature sensor 10.

The two contacting means 1, 2 in the exemplary embodiment shown in FIG. 3 and FIG. 7 are each provided with screw terminals 19 and 19' for electrically connecting the two thermocouple conductors 7 and 8 to the first and second contacting means 1 and 2. The two thermocouple conductors 7 and 8 can in each case be fed into said terminals and clamped by means of a clamping screw 20 and 20' respectively.

The electrical temperature sensor 10 is at least partially encompassed by a ceramic body 18 and hereby in turn defines a temperature sensing region 11 of the temperature sensor 10. One part of the temperature sensing region 11 of the electrical temperature sensor 10 is in each case attached to the first and to the second contacting means 1 and 2 by means of the adhesive joints 27 and 27' respectively for the purpose of measuring the temperatures of the comparison point at the conductor ends of a thermocouple electrically connected to the plug connector. In order to tap off the electrical temperature parameter, the two electrical contacts 12 and 13 of the temperature sensor 10 are soldered to the second and to the third contacting means 2 and 3.

Figure 4:
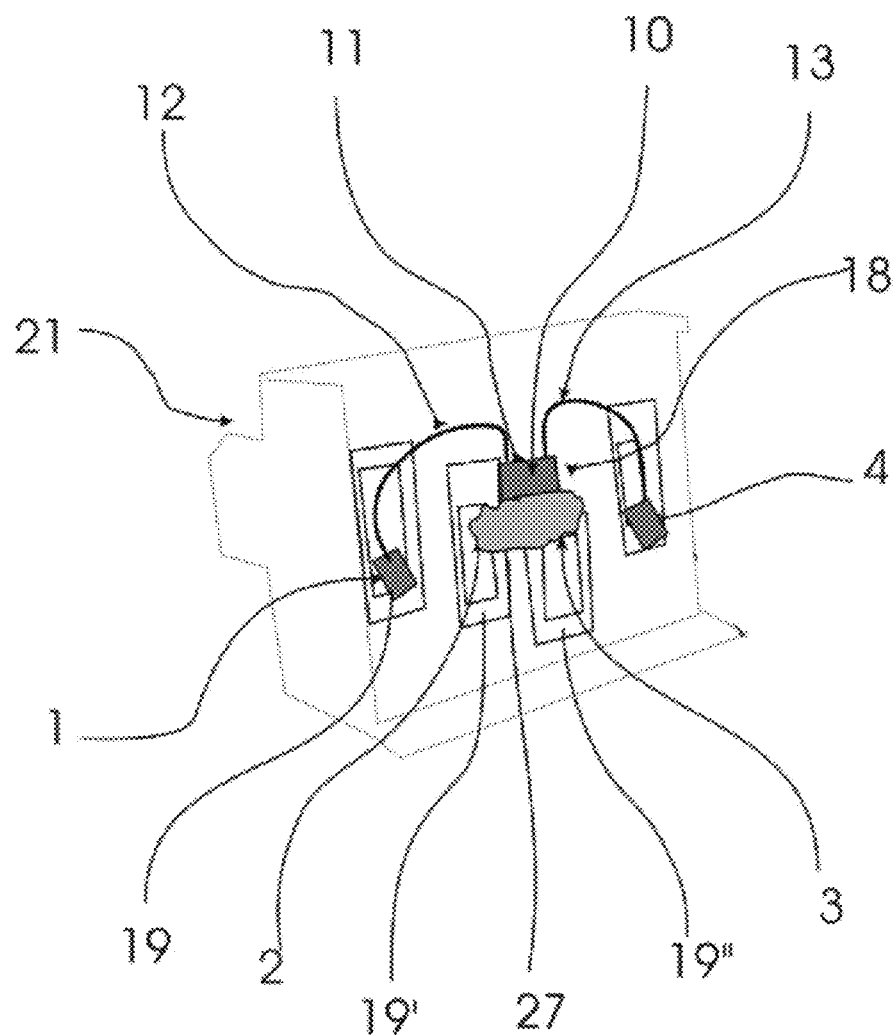
FIG. 4: shows a sketch of an open four-pole electric plug connector with a temperature sensor.
Figure 8:
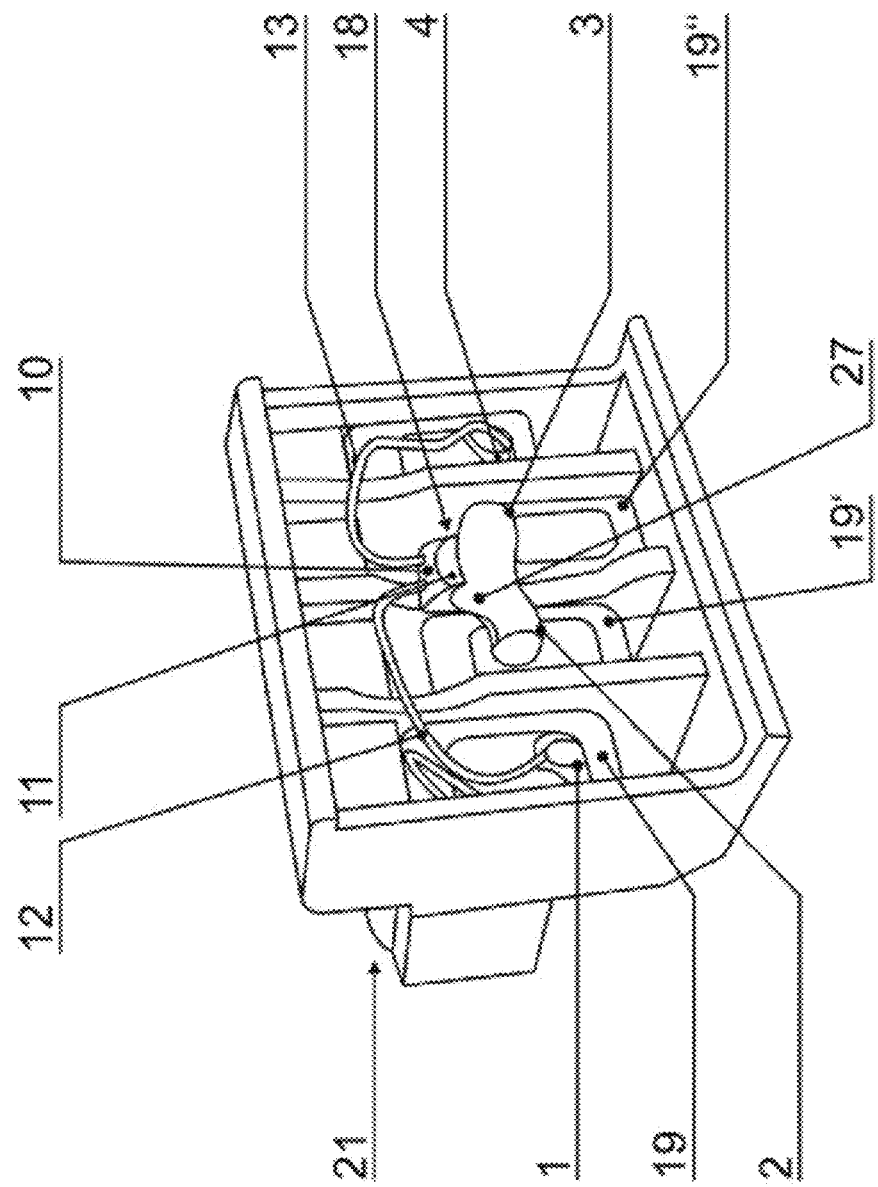
FIG. 8: shows an open four-pole electric plug connector as shown in the sketch of FIG. 4 with a temperature sensor.

FIG. 4 and FIG. 8 show the open plug connector housing 21 of an exemplary embodiment of a four-pole electric plug connector with a first, a second, a third and a fourth contacting means 1, 2, 3, 4 that are accommodated within a plug connector housing 21. A housing cover 21b of the plug connector housing 21 is not visible in FIG. 4 and FIG. 8.

Two thermocouple conductors 7 and 8 can be electrically connected to the second and third contacting means, while the first contacting means serves to electrically connect a first electrical contact 12 of a temperature sensor 10, and the fourth contacting means serves to electrically connect a first electrical contact 13 of the temperature sensor 10. This achieves a galvanic isolation of the measuring signals of the thermoelectric voltage, by means of the thermocouple, and the analog measuring signal for measuring the temperature of the comparison point, by means of the temperature sensor 10.

The two contacting means 2 and 3 in the exemplary embodiment shown in FIG. 4 and FIG. 8 are each provided with screw terminals 19' and 19" for electrically connecting the two thermocouple conductors 7 and 8 to the second and third contacting means 2 and 3. The two thermocouple conductors 7 and 8 can in each case be fed into said terminals and in each case clamped by means of a clamping screw (not visible in FIG. 4 and FIG. 8).

One part of a temperature sensing region 11 of the electrical temperature sensor 10 is in each case attached to the second and to the third contacting means 2 and 3 by means of the adhesive joints 27 and 27' respectively for the purpose of measuring the temperatures of the comparison point at the conductor ends of a thermocouple electrically connected to the plug connector, wherein the temperature sensing region 11 of the temperature sensor 10 is in turn likewise formed by a ceramic body 18 that, in an expedient development, at least partially encompasses the temperature sensor 10. In order to tap off the electrical temperature parameter, the two electrical contacts 12 and 13 of the temperature sensor 10 are soldered to the first and to the fourth contacting means 1 and 4.

Figure 5:
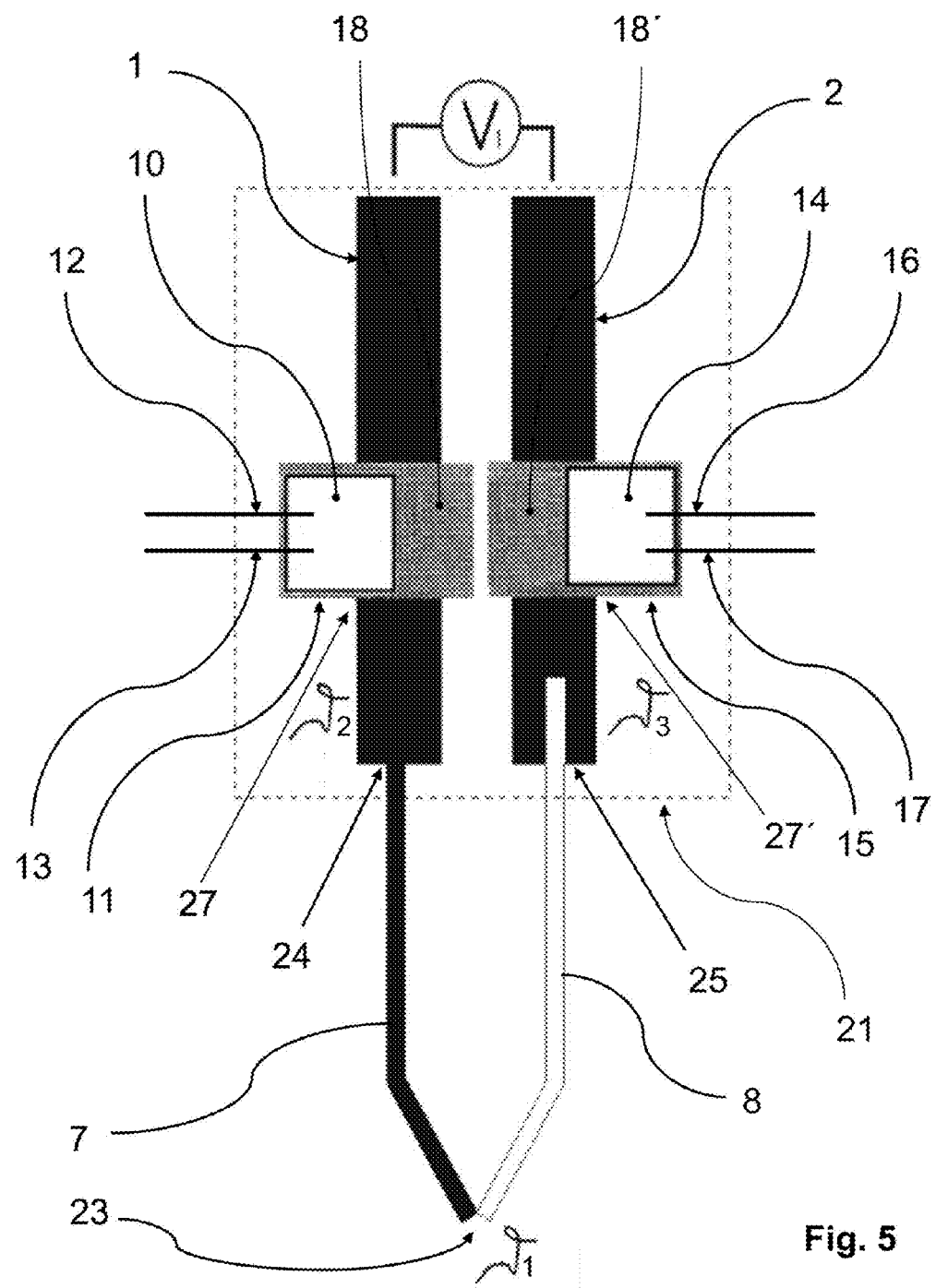
FIG. 5: shows an electric plug connector and two temperature sensors in schematic view.

FIG. 5 shows a schematic view of an embodiment of an electric plug connector with a first temperature sensor 10 and a second temperature sensor 14 based on an exemplary embodiment. A first and a second electrical contacting means 1 and 2 are arranged within a plug connector housing 21, which is shown by the dashed outline.

The two thermocouple conductors 7 and 8 of a thermocouple are in each case electrically connected to one end of the first and second electrical contacting means 1 and 2, wherein said thermocouple conductors are attached to one another at the measuring point 23 for measuring a temperature $\vartheta 1$ at a remote measuring location. At the opposite ends of the first and the second electrical contacting means 1 and 2 of the electric plug connector, a thermoelectric voltage V1 can be tapped off and transmitted to a circuit arrangement 9 by plugging the electric plug connector into a socket 22 that is fitted to a circuit arrangement 9.

In order to measure the two temperatures $\vartheta 2$ and $\vartheta 3$ of the comparison point at the comparison point 24 of the first thermocouple conductor 7 and the comparison point 25 of the second thermocouple conductor 8 respectively, which are connected to the two contacting means 1 and 2, one part of a temperature sensing region 11 of the first temperature sensor 10 is attached to the first contacting means 1 and one part of the temperature sensing region 15 of the second temperature sensor 14 is attached to the second contacting means 2.

The first temperature sensor 10 and the second temperature sensor 14 are in each case provided with a ceramic body 18 and 18' respectively that at least partially encompasses the temperature sensor 10 or 14 so that the two temperature sensing regions 11 and 15 of the temperature sensor 10 and the temperature sensor 14 respectively are formed by part of the encompassing ceramic 18 and 18' respectively. The surfaces of the two temperature sensing regions 11 and 15 in FIG. 5 again point into the plane of the drawing. One part of the temperature sensing region 11 of the first temperature sensor 10 is attached in a heat-conducting manner to the first contacting means 1 by a joint 27, and one part of the temperature sensing region 15 of the second temperature sensor 14 is attached in a heat-conducting manner to the second contacting means 2 by a joint 27'. Expediently, the joints are again adhesive joints. The first and the second contacting means 1 and 2 are consequently galvanically isolated from one another, and no temperature equalization takes place between the two contacting means 1 and 2.

In order to tap off the electrical parameter of the measurement of the temperature of the comparison point with the temperature sensor 10 and with the temperature sensor 14 respectively, their two electrical contacts 12 and 13 and 16 and 17 respectively are fed out of the plug connector housing.

In summary, in practice therefore, a joint that exclusively allows the transfer of heat between a contacting means and the part of the temperature sensing region of a temperature sensor that is attached to this contacting means to the layer elements that here improve the resulting boundary layer by joining, such as for example heat-conducting pastes or other mechanical layer elements that are advantageous for heat conduction, and/or allows joining means that are necessary for the joint, such as for example adhesives, welding fluxes or solder, screw or rivet connections, and/or allows means that enable electrical insulation so that the temperature sensing region of the temperature sensor is galvanically isolated from the contacting means, has been shown to be particularly advantageous for the invention. The part of the temperature sensing region that is attached, and therefore in particular immediately attached, to the contacting means is consequently located on the same material to which the thermocouple conductor is connected.

In variation with the embodiments described above, with which at least one part of a temperature sensor is encompassed by a ceramic, which in this case forms at least one part of the temperature sensing region of this temperature sensor, other protective layers and/or heat-conducting material layers can also be used.

Furthermore, it must be pointed out that the invention is not restricted to the formation of a temperature sensing region by an encompassing ceramic. The temperature sensing region can therefore have any form and a measuring surface of any size and be directly part of a temperature sensor that is suitable for measuring the surface temperature on at least one contacting means of the plug connector according to the invention. Furthermore, the temperature sensing region of the temperature sensor can take up part or a section of the overall surface of the temperature sensor, for example, or the temperature sensing region is formed by the whole outer surface of the temperature sensor.

LIST OF REFERENCES

1 First contacting means
2 Second contacting means
3 Third contacting means
4 Fourth contacting means
5 Fifth contacting means
6 Sixth contacting means
7 First thermocouple conductor
8 Second thermocouple conductor
9 Electrical circuit arrangement
10 First electrical temperature sensor 11 Temperature sensing region of the first temperature sensor
12 First electrical contact of the first temperature sensor
13 Second electrical contact of the first temperature sensor
14 Second electrical temperature sensor
15 Temperature sensing region of the second temperature sensor
16 First electrical contact of the second temperature sensor
17 Second electrical contact of the second temperature sensor
18 Ceramic body
19 Screw terminal
20 Clamping screw
21 Plug connector housing
21a Housing cover
22 Socket
23 Measuring point
24 Comparison point of the first thermocouple conductor
25 Comparison point of the second thermocouple conductor
26 Contacting means of the socket
27 Joint

The invention claimed is:

1. An electric plug connector for contacting with a complementary plug connector and for electrically connecting at least one first and one second thermocouple conductor, comprising
at least one electrically conductive first and second contacting means, wherein the first thermocouple conductor is adapted to be connected to the first contacting means, and the second thermocouple conductor is adapted to be connected to the second contacting means,
at least one first electrical temperature sensor, which is provided with a temperature sensing region and with at least one first and one second electrical contact, wherein at least one part of the temperature sensing region of the first temperature sensor is directly attached in a heat-conducting manner to the first contacting means by a joining connection.

2. The electric plug connector as claimed in claim 1, wherein at least one part of the temperature sensing region of the first temperature sensor is attached to the second contacting means by a second joining connection, and/or the temperature sensing region of the at least first temperature sensor is attached to the second contacting means in a heat-conducting manner and/or is galvanically isolated from the first and/or second contacting means.

3. The electric plug connector as claimed in claim 1, wherein the first thermocouple conductor is electrically connected to the first contacting means, and the second thermocouple conductor is electrically connected to the second contacting means.

4. The electric plug connector as claimed in claim 1, wherein the temperature sensing region comprises at least one part of the first temperature sensor that is heat-conducting and/or that is encompassed by at least one heat-conducting ceramic body, wherein the ceramic body serves to equalize the temperature between the first and second contacting means.

5. The electric plug connector as claimed in claim 1, wherein the joining connection between the temperature sensing region of the first temperature sensor and the first contacting means comprises the temperature sensing region of the first temperature sensor being bonded, jointed, or adhered directly to the first contacting means.

6. The electric plug connector as claimed in claim 1, wherein the joining connection between the temperature sensing region of the first temperature sensor and the first contacting means comprises the temperature sensing region of the first temperature sensor being attached directly to the first contacting means by means of one or more of an adhesive process, a welded connection, a solder connection, a screw, and a rivet connection.

7. The electric plug connector as claimed in claim 1, further comprising a second temperature sensor having a temperature sensing region, wherein at least one part of the temperature sensing region of the second temperature sensor is attached to the second contacting means by a second joining connection.

8. The electric plug connector as claimed in claim 7, wherein the first and second temperature sensors include respective temperature-dependent resistors.

9. The electric plug connector as claimed in claim 1, wherein the joining connection between the temperature sensing region of the first temperature sensor and the first contacting means comprises one or more of a paste, an adhesive, and a welding flux.

10. The electric plug connector as claimed in claim 9, wherein the one or more of a paste, an adhesive, and a welding flux is heat-conducting.

11. The electric plug connector as claimed in claim 9, wherein the joining connection between the temperature sensing region of the first temperature sensor and the first contacting means includes no intermediate components between the temperature sensing region of the first temperature sensor and the first contacting means.

12. The electric plug connector as claimed in claim 1, wherein the first electrical contact of the first temperature sensor is electrically connected to an electrically conductive third contacting means.

13. The electric plug connector as claimed in claim 12, wherein the second electrical contact of the first temperature sensor is electrically connected to the first contacting means.

14. The electric plug connector as claimed in claim 12, wherein the second electrical contact of the first temperature sensor is electrically connected to an electrically conductive fourth contacting means.

15. The electric plug connector as claimed in claim 14, further comprising a second temperature sensor having a temperature sensing region and first and second electrical contacts, wherein:
at least one part of the temperature sensing region of the second temperature sensor is attached to the second contacting means; and
the first electrical contact of the second temperature sensor is electrically connected to an electrically conductive fifth contacting means, and the second electrical contact of the second temperature sensor is electrically connected to an electrically conductive sixth contacting means.

16. A method for producing an electric plug connector as claimed in claim 1, wherein at least one part of the temperature sensing region of the first temperature sensor is attached to the first contacting means by a jointing process.

17. The method for producing an electric plug connector as claimed in claim 16, wherein, before the jointing process is carried out, a heat-conducting paste is applied to at least one part of the surface of the temperature sensing region of the first temperature sensor that is attached to the first contacting means.

18. The method for producing an electric plug connector as claimed in claim 16, wherein a bonding jointing process that is an adhesive process is used.

19. The method for producing an electric plug connector as claimed in claim 18, wherein an adhesive joint is made by means of a heat-conducting and/or electrically insulating adhesive.

* * * * *